Patented May 18, 1948

2,441,839

UNITED STATES PATENT OFFICE 2,441,839

PRODUCTION OF VANILLIC ACID

Irwin A. Pearl, Appleton, Wis., assignor to The Institute of Paper Chemistry, Appleton, Wis., a corporation of Wisconsin No Drawing. Application September 16, 1947, Serial No. 774,440

10 Claims. (Cl. 260—521)

The present invention relates to the production of vanillic acid, and more specifically to improved methods of producing vanillic acid from the aldehyde known as vanillin.

Recent developments in finding ways to utilize lignin-containing sulfite waste liquor and other lignin-containing wastes have included its decomposition into a variety of compounds including substantial quantities of vanillin. This compound has some uses as such, e. g. as a flavoring composition, but the volume needed for present uses is a minor fraction of the potential supply. The derived vanillic acid, however, is susceptible of a number of uses calling for relatively large quantities of material, and the art accordingly has been searching for commercially practical processes for the transformation of vanillin to vanillic acid.

Most aldehydes can be readily transformed to the corresponding acids or mixtures of acids and alcohols by oxidation or by the Cannizzaro reaction. Vanillin (known chemically as 3-methoxy,4-hydroxy-benzaldehyde), however, is an exception to the general rule as ordinary oxidizing agents and the Cannizzaro reaction either have no action at all, act as dehydrogenating agents, or cause complete decomposition.

Attempts have also been made to convert vanillin into vanillic acid (or the alkali metal derivative thereof) by heating vanillin with an alkali metal hydroxide. All such prior attempts, however, have resulted in the production of the unwanted demethylated product, protocatechuic acid, or to mixtures of protocatechuic and vanillic acids. See Berichte Deutsch. Chem. Gesell., vol. 7, pp. 615–618 (1874), where Tiemann et al. obtained only protocatechuic acid or Berichte Deutsch. Chem. Gesell., vol. 62B, pp. 1177–1188 (1928), where Lock obtained a mixture which on test showed the presence of 71 per cent protocatechuic acid and only 20 per cent of vanillic acid. In view of reported experiments of this type, investigators believed that demethylation took place simultaneously with oxidation and that it was therefore impossible to form vanillic acid substantially free from protocatechuic acid by reacting vanillin with an alkali metal hydroxide. Also, as experience had demonstrated that it was difficult, if not impossible, to separate pure vanillic acid in high yield from a mixture containing substantial amounts of protocatechuic acid, this reaction was deemed of no practical importance.

After an extended investigation, I have discovered that demethylation and oxidation do not necessarily take place simultaneously when reacting vanillin with an alkali metal hydroxide. I have also discovered that with proper control of temperature and time in such reaction mixtures that the reaction may be restricted to oxidation and that as a result thereof vanillic acid substantially free from protocatechuic acid may readily be obtained in the desired high yields by reacting vanillin with an alkali metal hydroxide. The following examples will serve for illustrative purposes.

Example I

About 83 parts of solid potassium hydroxide containing 85% of the pure chemical and 15% of water, together with 10 parts of additional water was heated with stirring to 125° C. in a nickel container. This mixture was a white gel. About 30 parts of vanillin were next added gradually with stirring and this caused the temperature of the mass to rise to about 140° C. After all the vanillin was added, the temperature was increased to 180° C. over a period of about half an hour with continued stirring. The mixture was then allowed to cool, the cooled mixture dissolved in 500 parts of water, and the resulting aqueous solution acidified with hydrochloric acid. This produced a copious white crystalline precipitate which was filtered and washed with water and dried at 105° C. This first precipitate represented a yield of 30.5 parts of vanillic acid, which had a melting point of 208°–209° C. To recover additional material the aqueous filtrate remaining from above, was saturated with salt and extracted with ether. Upon drying of the extract and distilling the ether, an additional 2.6 parts of vanillic acid was obtained, making a total yield of 33.1 parts, which represents 99.7% of the original vanillin.

Example II

About 10 parts of powdered 85% potassium hydroxide was heated slowly with stirring and liquefied at about 115° C. It was then allowed to cool slowly to about 85° C. at which temperature it was still liquid. Three parts of vanillin were then added at one time with stirring and a vigorous reaction took place, raising the temperature to about 150°–160° C. The reaction mixture was allowed to cool and then dissolved in 60 parts of hot water and acidified with hydrochloric acid. The yield after processing and recovery as in Example I, was 3.2 parts of vanillic acid which represents 96.5% of the original vanillin.

Any of the alkali metal hydroxides may be employed in place of potassium hydroxide, although when using other hydroxides the use of a combination containing at least about 30 per cent potassium hydroxide is generally preferred. One of the preferred combinations contains about 50 per cent potassium hydroxide and 50 per cent sodium hydroxide. Powdered or solid alkali metal hydroxides such as caustic soda or anhydrous potassium hydroxide which do not melt below 235° C. may be employed in the process, although it is preferred to use hydrated potassium hydroxide or potassium hydroxide (hydrated or anhydrous) with sodium hydroxide, as hydrated potassium hydroxide and mixtures of potassium hydroxide and sodium hydroxide melt or fuse within the reaction temperature range of the process. The process is equally effective when the ingredients are mixed cold and subsequently heated or when the alkali metal hydroxide is heated to the working temperature and the vanillin added to it.

The temperatures employed in carrying out the reaction range for practical purposes from about 115° C. to about 235° C., with the range of about 140°–180° C. being generally preferred. The time of the reaction varies with temperatures employed, i. e. at the lower temperatures longer times are required and at the higher temperatures shorter times are required. In order to prevent protocatechuic acid formation, with an initial temperature of about 210° C. and a final temperature of about 235° C. the maximum reaction time should not exceed about 10 minutes and with an initial temperature of about 180° C. and a final temperature of about 210° C. the maximum reaction time should not exceed about 30 minutes. In the preferred operation, with an initial temperature of about 140° C. and a final temperature of about 180° C. the optimum reaction time is approximately 30 minutes. As the reaction times decrease with increasing temperature, it will be apparent that the times given above will vary somewhat depending on whether most of the heating period is spent at the lower or higher temperatures. In all cases, the reaction mixtures should be adequately agitated or stirred to prevent local overheating, i. e. provide for the uniform distribution of heat throughout the reaction mixture.

The control of the combination, temperature and time, as well as the use of temperatures below about 235° C. is essential to prevent the formation of protocatechuic acid. In this connection I have found it advisable to test the reaction mixture as the reaction proceeds and to stop the reaction by cooling the mixture at least as soon as a test sample shows the presence of a trace of protocatachuic acid. A convenient testing procedure is as follows. Dissolve a small portion of the alkaline reaction mixture in water, neutralize to a pH of about 7 with hydrochloric acid, and then add a few drops of aqueous ferric chloride testing solution. If upon addition of the ferric chloride the mixture turns dark green, the reaction mixture should be cooled immediately, as the dark green color signifies that the mixture contains protocatechuic acid. The presence of protocatechuic acid may also be confirmed by adding a small amount of aqueous sodium carbonate to the green solution which turns red if the mixture contains protocatechuic acid. These tests are very sensitive and may be used to determine the presence of even a slight trace of protocatechuic acid.

When employing temperatures below about 180° C. the time of the reaction is not particularly critical, for at the lower temperatures, e. g. 115°–180° C., practically no protocatechuic acid is formed. When employing temperatures above 180° C. the time of the reaction starts to become critical and becomes increasingly so as the temperature increases. When operating particularly at the higher temperatures, I have found it advisable to run a control test with a sample of the reaction mixture to determine the optimum reaction time at the temperature or temperatures to be employed. This may be done by using the ferric chloride test described above on portions of the control sample and determining the point at which protocatechuic acid first appears in the control mixture. With this data the main reaction mixture is then treated under similar conditions except that the reaction is stopped at a point just prior to the point at which protocatechuic acid appeared in the control sample. This procedure has also been found advisable when employing new reaction mixtures as the reaction times vary somewhat when different ratios of ingredients are employed.

The basic reaction may be illustrated by the following equation:

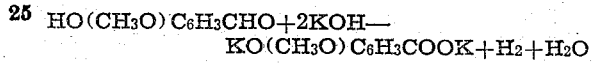

$$HO(CH_3O)C_6H_3CHO + 2KOH \longrightarrow$$
$$KO(CH_3O)C_6H_3COOK + H_2 + H_2O$$

and satisfactory operation can be secured with the reagents present in stoichiometric ratio, which would call for 132 parts of 85 per cent potassium hydroxide to react with 152 parts of vanillin. However, it is desirable in practice to have a material excess of alkali present (e. g. 2–3 parts by weight of alkali to 1 part by weight of vanillin) to insure complete reaction of all the vanillin. The free vanillic acid may be obtained as shown in the examples, by treating the alkali metal (or K derivative shown above) with an inorganic acid. When using iron or stainless steel containers, initial acidification with hydrochloric acid results in the formation of an off-color product. This may be avoided by acidifying with sulfur dioxide; one of the preferred methods of operation when using iron containers provides for initial acidification with sulfur dioxide and subsequent acidification with an inorganic acid such as hydrochloric acid, sulfuric acid, etc.

There is nothing critical about the reaction, with respect to catalytic action by the container wall, and any surface chemically resistant to the reaction mixture appears to be satisfactory. Iron, nickel, and stainless steel containers have given good results with high yields of the protocatechuic acid-free vanillic acid.

The present application is a continuation in part of my co-pending application Serial No. 564,407, filed November 20, 1944, now abandoned.

I claim:

1. In the process of preparing vanillic acid substantially free from protocatechuic acid, the improvement which comprises reacting vanillin with an alkali metal hydroxide at a temperature not exceeding about 235° C. to about the time when the first test sample thereof dissolved in water and neutralized turns green on the addition of aqueous ferric chloride, and then stopping the reaction by cooling the reaction mixture to prevent conversion of vanillic acid to protocatechuic acid.

2. In the process of preparing vanillic acid substantially free from protocatechuic acid, the improvement which comprises heating vanillin with an alkali metal hydroxide at a temperature of about 115°–235° C., and then cooling the reaction mixture at about the point when the first test sample thereof dissolved in water and neutralized turns green on the addition of aqueous ferric chloride.

3. In the process of preparing vanillic acid substantially free from protocatechuic acid, the improvement which comprises reacting vanillin with fused potassium hydroxide at a temperature of about 115°–235° C., for a period of time not exceeding the point at which a test sample of the reaction mixture dissolved in water and neutralized turns green on the addition of aqueous ferric chloride.

4. In the process of preparing vanillic acid substantially free from protocatechuic acid, the improvement which comprises reacting vanillin with a fused mixture of potassium and sodium hydroxides at a temperature of about 115°–235° C., and for a period of time not exceeding the point at which a test sample of the reaction mixture dissolved in water and neutralized turns green on the addition of aqueous ferric chloride.

5. In the process of preparing vanillic acid substantially free from protocatechuic acid, the improvement which comprises reacting vanillin with an alkali metal hydroxide at a temperature of about 140°–180° C. and for a period of time not exceeding the point at which a test sample of the reaction mixture dissolved in water and neutralized turns green on the addition of aqueous ferric chloride.

6. In the process of preparing vanillic acid substantially free from protocatechuic acid, the improvement which comprises reacting vanillin with fused potassium hydroxide at a temperature of about 140°–180° C. and for a period of time not exceeding the point at which a test sample of the reaction mixture dissolved in water and neutralized turns green on the addition of aqueous ferric chloride.

7. In the process of preparing vanillic acid substantially free from protocatechuic acid, the improvement which comprises reacting vanillin with fused potassium hydroxide at a temperature of about 180°–210° C. for a period of time not exceeding the point at which a test sample of the reaction mixture dissolved in water and neutralized turns green on the addition of aqueous ferric chloride.

8. In the process of preparing vanillic acid substantially free from protocatechuic acid, the improvement which comprises reacting vanillin with fused potassium hydroxide at a temperature of about 210°–235° C. for a period of time not exceeding the point at which a test sample of the reaction mixture dissolved in water and neutralized turns green on the addition of aqueous ferric chloride.

9. The process of preparing vanillic acid substantially free from protocatechuic acid which comprises reacting vanillin with fused potassium hydroxide at a temperature of about 140°–180° C., and for a period of time not exceeding the point at which a test sample of the reaction mixture dissolved in water and neutralized turns green on the addition of aqueous ferric chloride, dissolving the reaction mass in water, acidifying the solution and recovering the resulting vanillic acid precipitate.

10. The process of preparing vanillic acid substantially free from protocatechuic acid which comprises reacting vanillin with a mixture of fused potassium hydroxide and sodium hydroxide at a temperature of about 140°–180° C., and for a period of time not exceeding the point at which a test sample of the reaction mixture dissolved in water and neutralized turns green on the addition of aqueous ferric chloride, dissolving the reaction mass in water, acidifying the solution and recovering the resulting vanillic acid precipitate.

IRWIN A. PEARL.

REFERENCES CITED

The following references are of record in the file of this patent:

Tiemann et al., Ber. Deut. Chem., vol. 7, pages 615–618 (1874).

Lock. Ber. Deut. Chem., vol. 62B, pages 1177–1188 (1928).